United States Patent [19]

Tseng et al.

[11] Patent Number: 5,238,736
[45] Date of Patent: Aug. 24, 1993

[54] POLYMERIC MICROSPHERES FOR LOW-FRICTION SURFACES

[75] Inventors: Chi-Ming Tseng, Woodbury; Chung I. Young, St. Paul, both of Minn.; Manisha Sarkar, Austin, Tex.

[73] Assignee: Minnesota Mining and Manufacturing Company, St. Paul, Minn.

[21] Appl. No.: 947,403

[22] Filed: Sep. 18, 1992

[51] Int. Cl.$^5$ ............................................. B32B 5/16
[52] U.S. Cl. ................................. 428/327; 428/337; 428/341; 428/402; 126/323.1; 126/323.2
[58] Field of Search ................... 526/323.1, 323.2; 428/327, 337, 344, 402

[56] References Cited

U.S. PATENT DOCUMENTS

| | | | |
|---|---|---|---|
| 2,701,245 | 2/1955 | Lynn | 260/89.5 |
| 2,932,629 | 4/1960 | Wiley | 260/91.5 |
| 4,277,536 | 7/1981 | Podszun et al. | 428/402 |
| 4,414,278 | 11/1983 | Cohen et al. | 428/402 |
| 4,614,708 | 9/1986 | Timmerman et al. | 430/517 |
| 4,861,818 | 8/1989 | Timmerman et al. | 524/460 |
| 4,869,955 | 9/1989 | Ashcraft et al. | 428/327 |
| 4,912,009 | 3/1990 | Amering et al. | 430/137 |
| 4,952,650 | 8/1990 | Young et al. | 526/194 |

FOREIGN PATENT DOCUMENTS 0379122  7/1990  European Pat. Off.
62231957  7/1990  Japan.

*Primary Examiner*—John Kight, III
*Assistant Examiner*—Duc Truong
*Attorney, Agent, or Firm*—Gary L. Griswold; Walter N. Kirn; Janice L. Dowdall

[57] ABSTRACT

The present invention relates to polymeric microspheres comprised of short-chain diol diacrylate homopolymers or copolymers of diol diacrylates and long-chain acrylate esters, which exhibit excellent antifriction characteristics when applied on the surface of plastic sheets. Treated sheets exhibit a significantly lower coefficient of friction than sheets treated with commercially-available microspheres.

11 Claims, No Drawings

POLYMERIC MICROSPHERES FOR LOW-FRICTION SURFACES

FIELD OF THE INVENTION

This invention relates to di(meth)acrylate (co)polymeric microspheres which impart a significantly low coefficient of friction to polymer films when coated thereon.

BACKGROUND OF THE INVENTION

The use of antiblocking and slip agents for polymer films is well-known in the art. Antiblocking agents lend a fine structure to otherwise smooth film surfaces such that a small air space is maintained between film surfaces, preventing adhesion of two pieces of film to each other. Early antiblocking agents were made of fine powders of inorganic or polymeric materials which were adhered to a film surface or were incorporated into extruded films. Such powders have broad particle size distribution and are typically non-spherical, hence they often impart an undesirable hazy appearance to the film. In recent years, the use of polymeric beads or microspheres has grown. Such microspheres can be produced in narrow particle size distributions and in a variety of shapes (spheres, ovoids, pearls, etc.) to suit particular applications. In addition, by appropriate choice of materials and particle size, such beads are quite transparent on a film surface.

When referring to materials coated onto polymeric sheets, "slip agents," "antiblocking agents," and "antifriction agents" all refer to materials which prevent two sheets from adhering together. These three terms are used interchangeably herein. Typically, polymeric film sheets with smooth surfaces possess a high coefficient of friction such that they tend to "block" or adhere to each other.

Polymeric beads are commercially available, including the Microthene F ™ brand of polyethylene and ethylene-vinyl acetate beads from U.S.I. Chemicals, Inc., Pergopak M-2 ™ urea-formaldehyde beads from Ciba-Geigy, and Fine Pearl 3000F ™ polystyrene beads from Matsumoto Co. Polyethylene and urea-formaldehyde beads are not spherical in shape and often provide hazy appearance to films on which they are coated. Polystyrene and poly(methylmethacrylate) beads produce their antiblocking effect mechanically due to the hardness of their surfaces rather than through any lubricating effect.

The production of hard polymethylmethacrylate beads by suspension polymerization methods is well known (U.S. Pat. No. 2,701,245, to duPont). The use of these beads as antiblocking or slip agents in polymer films for transparencies is described in U.S. Pat. No. 4,869,955, to duPont. Microspherical beads made from monofunctional ethylenically-unsaturated monomers are described in U.S. Pat. Nos. 4,614,708 and 4,861,818, both to AGFA-Gevaert. These beads are used in an antifriction layer of a photographic element. No quantification of the antifriction properties of these beads is presented.

Long-chain ($C_{12}$ to $C_{30}$) hydrocarbons have long been recognized as lubricants, especially long-chain aliphatic carboxylic acids and esters. For example, stearic acid derivatives and stearyl esters are well-known and enjoy wide use as additives to coatings or to polymer constructions where lubricity is desired. The use of other fatty acids and fatty acid esters, including polymers comprising such acids and esters, as lubricants is well known in the art. However, polymeric beads comprising long-chain aliphatic moeities are not well known. Japanese Patent Application 87 231957 (Konica Co.) discloses an uncrosslinked latex of stearyl acrylate used in photographic film constructions. Good antiblocking properties are indicated, although the submicron sized latex produced by the emulsion polymerization process described would form a film when coated rather than discreet particles.

Thus, commercially-available microspheres comprise polymers of monofunctional monomers, such as methyl methacrylate, styrene, ethylene, and tetrafluoroethylene. Difunctional acrylates such as butanediol di(meth)acrylate, hexanediol di(meth)acrylate, and related short-chain diol di(meth)acrylates have been used to encapsulate pigment particles by suspension polymerization methods as described in European Patent Application 379 122, to Dainichi Seika. These beads are pigmented and used as polymeric coloring agents. U.S. Pat. No. 4,277,536, to Bayer AG, discloses polymer beads from two highly viscous (500 to 500,000 mPa.s) diacrylate monomers: the bis-glycidyl methacrylate of Bisphenol A, known as bis-GMA; and the bis-hydroxylaklydiacrylate of 1,9-diisocyanatononane. The beads are used as dental fillers. U.S. Pat. No. 4,414,278 describes production of highly solvent-stable spherical microbeads from crosslinked triacrylate or tetraacrylate monomers and copolymers of the tri- or tetra-acrylates with up to 50 percent by weight of comonomers having two terminal ethylenic groups. No polymeric beads of purely diacrylate monomers are disclosed or claimed, and no antifriction properties of the beads are described.

A need exists for microsphere slip or antiblocking agents which can be coated on polymeric sheets such as those used for overhead transparencies which impart a significantly lower coefficient of friction compared to known slip or antiblocking agents.

SUMMARY OF THE INVENTION

We have discovered a class of novel polymeric microspheres produced from diol di(meth)acrylate homopolymers which impart surprising antifriction characteristics when coated on polymeric sheets, such as those used for overhead transparencies. Further, we have discovered that microspheres arising from copolymers of these diol di(meth)acrylates with long-chain fatty alcohol esters of (meth)acrylic acid also exhibit excellent antifriction characteristics.

The invention provides novel polymeric microspheres of from about 0.1 to about 50 microns in diameter produced from homopolymers of diol di(meth)acrylates and/or their copolymers with long-chain aliphatic alcohol esters of (meth)acrylic acid and/or ethylenically unsaturated comonomer. Surprisingly, the beads are very effective as slip or antifriction agents when coated onto the surface of polymer sheets such as those used for projection transparencies. The microspheres of this invention provide a significantly lower coefficient of friction than polymer microspheres commonly used as antiblocking agents.

The present invention provides a bead having a mean bead diameter of from about 0.1 to about 50 microns, the bead comprising:
(a) about 20 to about 100 percent by weight of (co)-polymerized diol di(meth)acrylate having a viscosity of about 1 mPa.s to about 400 mPa.s, the diol di(meth)acrylate having the formula $$CH_2=CR^2COOC_nH_{2n}OOCCR^2=CH_2$$

wherein
$R^2$ is H or $CH_3$; and
n is an integer of about 4 to about 18;
(b) about 0 to about 80 percent by weight of at least one copolymerized vinyl monomer of the formula $$CH_2=CR^2COOC_mH_{2m+1}$$

wherein
$R^2$ is H or $CH_3$; and
m is an integer of about 12 to about 40;
(c) about 0 to about 30 percent by weight of at least one copolymerized ethylenically unsaturated monomer selected from the group consisting of vinyl esters, acrylic esters, methacrylic esters, styrene, styrene derivatives, and mixtures thereof; and
(d) about 0 to about 10 percent by weight of at least one organosilane coupling agent selected from the group consisting of glycidoxyalkyl trimethoxysilanes and (aminoalkylamino) alkyl trimethoxysilanes; wherein the weight percentages are based on the total weight of (a) plus (b) plus (c) plus (d).

The percentages of (a) plus (b) plus (c) plus (d) total 100.

This invention also provides for coated substrates comprising polymeric sheets coated with the beads of the present invention.

DEFINITIONS

The term "bead" as used herein refers to a nonencapsulated solid (co)polymeric bead.

DETAILED DESCRIPTION OF THE INVENTION

The bead of the invention comprises the reaction product of a mixture comprising diol di(meth)acrylate(s), option long-chain (meth)acrylate(s), optional ethyenically unsaturated comonomer(s), and optional organosilane coupling agent(s).

DIOL DI(METH)ACRYLATES

Useful diol di(methy)acrylates (also referred to herein as the difunctional monomer) are those represented by the formula $$CH_2=CR^2COOC_nH_{2n}OOCCR^2=CH_2 \quad (I)$$

wherein $R^2$ is H or $CH_3$ and n is an integer of about 4 to about 18, preferably about 6 to about 14.

The diol di(meth)acrylate may be optionally copolymerized with long-chain (meth)acrylate(s) and/or ethylenically unsaturated comonomers. The term "diol di(meth)acrylate" includes diol diacrylates and dimethacrylates. Examples of such monomers include but are not limited to those selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof. Preferred monomers include those selected from the group consisting of 1,4-butanediol di(meth)acrylate, 1,6-hexanediol di(meth)acrylate, 1,12-dodecanediol di(meth)acrylate, 1,14-tetradecanediol di(meth)acrylate, and mixtures thereof.

LONG-CHAIN (METH)ACRYLATES

Useful long-chain monomers, which can be copolymerized with the diol di(meth)acrylate(s) and optional ethylenically-unsaturated comonomer(s), are represented by the formula $$CH_2=CR^2COOC_mH_{2m+1} \quad (II)$$

wherein $R^2$ is H or $CH_3$ and m is an integer of about 12 to about 40, preferably about 12 to about 18. Stearyl methacrylate ($C_{18}$) and lauryl acrylate ($C_{12}$) are particularly useful because of their solubility and the lubricating properties they impart to the beads of the invention.

Examples of specific monomers include but are not limited to those selected from the group consisting of lauryl (meth)acrylate, octadecyl (meth)acrylate, stearyl (meth)acrylate, and mixtures thereof.

ETHYLENICALLY-UNSATURATED COMONOMERS

The diol di(meth)acrylates and optional long-chain (meth)acrylates are optionally copolymerized with additional ethylenically-unsaturated comonomers (also referred to herein as the "third monomer"). Such added comonomers are used to impart higher strength or higher $T_g$s to the resulting copolymer beads, or to modify the degree of interaction between the coated copolymer beads and other materials which may be coated onto the substrate in addition to the beads of the present invention. Examples of such monomers include but are not limited to those selected from the group consisting of vinyl esters such as vinyl acetate, vinyl propionate, and vinyl pivalate; acrylic esters such as methyl acrylate, cyclohexylacrylate, benzylacrylate, isobornyl acrylate, hydroxybutyl acrylate, and glycidyl acrylate; methacrylic esters such as methyl methacrylate, butyl methacrylate, cyclohexyl methacrylate, benzyl methacrylate, ethyl methacrylate, gamma-methacryloxypropyl trimethoxylsilane, and glycidyl methacrylate; styrene; vinyl toluene; alpha-methyl styrene, and mixtures thereof.

FUNCTIONAL ADDITIVES

In addition to the above-noted optional ethylenically-unsaturated comonomers, beads of the present invention may also optionally further comprise additional additives which are not ethylenically-unsaturated but which contain functional groups capable of reacting with materials containing reactive functional groups which may also be coated on the substrate along with the anti-friction beads. Such additives are useful in modifying the degree of interaction or bonding between the beads and the additional coating materials. Examples of such functional additives include but are not limited to well-known organosilane coupling agents such as those selected from the group consisting of glycidoxyalkyl trimethoxysilanes such as gamma-glycidoxypropyl trimethoxysilane and (aminoalkylamino) alkyl trimethoxysilanes such as 3-(2-amino ethyl amino) propyl trimethoxysilane. The alkyl groups of said coupling agents are typically $C_1$–$C_8$ groups.

INITIATORS

Free radical thermal initiators useful in the present invention include those oil-soluble and essentially water-insoluble initiators normally suitable for free-radical polymerization of acrylate monomers. By the term "oil-soluble" is meant that the initiator is soluble in the water-insoluble monomer or monomer mixture. A range of known oil soluble, hydrophobic initiators for addition polymerization can be used. These species include azo compounds as well as organic peroxides such as benzoyl peroxide and lauroyl peroxide and other thermal initiators. Examples of azo compounds include 2,2'-azobis(2-methylbutyronitrile), 2,2'-azobis(isobutyronitrile). Commercial products of this type include VAZO TM 67, VAZO TM 64 and VAZO TM 52 initiators supplied by duPont.

Typically about 0.1 to about 1.0 percent by weight of an initiator is used based upon the total monomer weight (i.e., difunctional monomer, long-chain monomer, and third monomer).

INHIBITOR

Also desirable in the polymerization reaction mixture is a water-soluble substance to prevent the emulsion or solution polymerization of the monomers in the aqueous phase. Examples of inhibitors include but are not limited to those selected from the group consisting of sodium nitrite, copper salts, methylene blue, potassium dichromate, phenols, and mixtures thereof. A preferred example of such a water-soluble polymerization inhibitor is potassium dichromate.

Typically about 0.01 to about 0.1 percent by weight of an inhibitor is used based on the total weight of water.

SUSPENSION POLYMERIZATION METHODS

Antifriction beads of the present invention can be produced by either of three generally known suspension polymerization methods. The method described in U.S. Pat. No. 4,952,650 (to 3M), incorporated by reference herein, uses conventional suspension agents with optional anionic surfactants. The method described in U.S. Pat. No. 4,912,009 (to Eastman Kodak Company), incorporated by reference herein, the "limited coalescence method", uses a negatively-charged colloidal silica suspending agent and a water-soluble promoter. The "surfactant method" employs a surfactant as a suspending agent, to produce smaller particle sizes. All three methods are described in detail below.

I.

LIMITED COALESCENCE METHOD

SUSPENDING AGENT

The suspending agent used in the method of the invention is negatively-charged colloidal silica. It is used with a water-soluble "promoter" that affects the hydrophobic-hydrophilic balance of the colloidal particles. More specifically, the promoter forms a complex with the suspending agent which is less hydrophilic than the colloidal particles of the suspending agent. As stated in Wiley et al., U.S. Pat. No. 2,932,629, incorporated by reference herein, the promoter drives the particles of the colloid to the liquid-liquid interface of the oleophilic or hydrophobic droplets and the aqueous medium.

The colloidal silica particles have dimensions from about 1 to 100 nanometers and preferably from about 5 to 70 nanometers. The size and concentration of these particles controls the size of the polymer particles. Smaller silica particles and higher silica concentration provides smaller bead diameters.

Hydrophilic colloidal silica useful as the suspending agent is available commercially, for example, under the tradenames and in the particle sizes as follows: LUDOX TM, 20 nm; LUDOX HS-40, 12 nm; LUDOX SM, 7 nm; and LUDOX AM, 12 nm; all supplied by E. I. du Pont de Nemours Company; and NALCOAG 1060, 60 nm supplied by Nalco Chemical Company.

Typically, about 0.3 to about 5 percent by weight of a suspending agent is used based upon the weight of the aqueous phase.

PROMOTER

The method of suspension polymerization used in the present invention calls for the use of a water-soluble organic promoter moiety which functions to adjust the hydrophile-lipophile balance on the surface of the silica stabilizer. Typically, the promoter is a low-molecular weight (i.e., about 200 to about 1000 number average molecular weight) condensation polymer of a lower alkylene dicarboxylic acid and an alkanol amine. The dicarboxylic acid can have an alkylene chain from about 2 to about 6 carbon atoms in length. The preferred diacid of this class is adipic acid. The alkanol amine preferably is a lower alkanol amine of which the alkanol groups contain from about 1 to about 4 carbon atoms, selected from the group consisting of diethanolamine, 2-amino-2-ethyl-1,3-propanediol, methyl amino ethanol, N-methyldiethanolamine, N-propyldiethanolamine and N-butyldiethanolamine. With adipic acid these form the polyesters (by which term we also include polyesteramides), such as poly(diethanolamine adipate) and poly(methylamino ethanol adipate). Preferably, the promoter is a condensation polymer of adipic acid and diethanolamine. The components of the promoter are chosen to ensure good water solubility and sufficient complexing with colloidal silica. The polyesters form a complex with hydrophilic colloidal silica, which is also hydrophilic but is less hydrophilic than the silica alone. As a consequence, the complex is compatible with the hydrophobic or oleophilic monomers dispersed in the aqueous reaction medium. The complex coats the monomer droplets and inhibits their coalescence.

Typically, about 0.02 to about 0.5 percent by weight of a promoter is used based on the weight of the aqueous phase.

II.

STABILIZER-SURFACTANT METHOD

Suspension Stabilizers

Suspension stabilizers useful in preparing the microsphere of the present invention are those conventionally used in suspension polymerization processes. The terms "suspension stabilizers", "suspending agents", and "suspension agents" are used interchangeably herein. They may be minimally water-soluble inorganic salts such as those selected from the group consisting of tribasic calcium phosphate, calcium carbonate, calcium sulfate, barium sulfate, barium phosphate, magnesium carbonate, and mixtures thereof. Preferred inorganic suspending agents include those selected from the group consisting of barium sulfate, tribasic calcium phosphate, and mixtures thereof. Water-soluble organic suspending agents may also be used such as those selected from the group consisting of polyvinyl alcohol, poly-N-vinylpyrrolidone, polyacrylic acid, polyacrylamide, and hydroxyalkyl cellulose. The suspending agent is present in amounts ranging from about 0.01 to about 5 parts by weight based upon 100 parts of total monomers present.

Surfactant

Surfactants useful in the "stabilizer-surfactant" method are typically anionic surfactants, preferably sodium lauryl sulfate and sodium dioctyl sulfosuccinate. Nonionic surfactants may also be included so long as an anionic surfactant is present and predominates. The amount of surfactant is preferably from about 2.5 ppm to about 1.0 part based on 100 parts total monomer content.

III.

Surfactant Method

When polymeric particles of less than one micron in diameter are desired, a surfactant or emusifying agent alone is used as the suspending agent.

SURFACTANT

Surfactants or emulsifiers useful in the "surfactant method" are typically anionic sufactants, cationic surfactants and nonionic sufactants. Anionic surfactants useful in the present invention include but are not limited to the group consisting of alcohol sulfates, alkylaryl sulfonates, ethoxylated alkyl phenol sulfates, ethoxylated alkyl phenol sulfonates and mixtures thereof. Cationic surfactants include but are not limited to the group consisting of quaternary ammonium salts wherein at least one higher molecular weight group and two or three lower molecular weight groups are linked to a common nitrogen atom to produce a cation, and wherein the electrically-balancing anion is selected from the group consisting of a halide (bromide, chloride, etc.), acetate, nitrite, and lower alkyosulfonate (methosulfate, ethyosulfate, etc.), and mixtures thereof. Nonionic surfactants useful in the present invention include but are not limited to the group consisting of ethoxylated alkyl phenols, ethoxylated fatty acids, and ethoxylated fatty alcohols and mixtures thereof. A combination of more than one surfactant or emulsifier is also found to be useful in the invention. For the "surfactant method," a useful concentration range of the surfactant is from about 0.2 parts to 5 parts, based on 100 parts of total monomers.

PREFERRED EMBODIMENT

Polymeric beads of the present invention are produced by known suspension polymerization methods such as those described in U.S. Pat. No. 4,912,009, incorporated by reference herein. Typically, a reaction mixture of monomers, a suspension stabilizer, and free-radical initiator is stirred in water under high-speed agitation conditions to break the monomer phase into small droplets. The stirred suspension is heated under nitrogen while polymerization takes place and the desired beads are formed. The beads are collected and washed with water, then dried.

In the method of the invention the polymer beads are synthesized by suspension polymerization of the monomers. Water-insoluble monomers comprising di(meth)acrylates, optional long-chain (meth)acrylates, and optional ethylenically unsaturated comonomers as well as an initiator are dispersed as small droplets in an aqueous medium. The droplets are stabilized by a water-dispersible but water-insoluble suspending agent.

In one embodiment of the method of the invention, a mixture is formed of water, an inhibitor of solution polymerization (such as potassium dichromate), the promoter, i.e., the polyester of a lower alkylene dicarboxylic acid with an amino alkanol and the suspending agent, i.e., colloidal silica.

In a separate vessel the free radical initiator is dissolved in the liquid monomer or mixture of monomers. The monomer or monomer mixture is then added to the aqueous mixture in the reaction vessel with high shearing agitation to obtain a suspension of monomer droplets. The heavy shearing forces reduce the size of the monomer droplets and during this time an equilibrium is reached. The size of the droplets is stabilized or limited by the suspending agent complex which coats their surfaces.

The mixture is then heated and stirred in the reaction vessel to polymerize the monomer droplets. The resulting polymer beads are isolated by filtration and washed with water to remove water-soluble impurities and free suspending agent complex.

The beads of the invention can comprise the reaction product of about 20 to about 100 weight percent diol di(meth)acrylate, about 0 to about 80 weight percent long-chain (meth)acrylate, and about 0 to about 30 weight percent ethylenically unsaturated comonomer, and about 0 to about 10 percent by weight of organosilane coupling agent, wherein the percentages are based upon the total weight of the monomers and coupling agent. If only one additional type of monomer is included, the microsphere can comprise about 20 to about 99 percent diol di(meth)acrylate and about 1 to about 80 percent long-chain (meth)acrylate or ethylenically unsaturated comonomer. If both long-chain (meth)acrylate and ethylenically unsaturated monomers are included, the microsphere can comprise about 20 to about 98 percent diol di(meth)acrylate, about 1 to about 79 percent long-chain (meth)acrylate, and about 1 to about 29 percent ethenically unsaturated comonomer. The beads of the present invention preferably comprise about 30 to about 80 percent diol di(meth)acrylate and about 20 to about 70 percent long-chain (meth)acrylate, 0 to about 20 percent ethylenically unsaturated comonomer, and about 0 to about 10 percent organosilane coupling agent. Most preferably the beads of the present invention comprise about 40 to about 60 percent diol di(meth)acrylate, about 40 to about 60 percent long-chain (meth)acrylate, about 0 to about 15 percent ethylenically unsaturated comonomer, and about 0 to about 5 percent of organosilane coupling agent.

The beads of the invention can be coated on a variety of substrates. The beads of can be coated on polymeric materials such as sheet material (over polyesters and polyolefins), resulting in a reduction of the coefficient of friction. The beads may optionally be intermixed with a resin selected from the group consisting of acrylates, polyurethanes, polyesters, polyamides, vinyl esters, and mixtures thereof before coating on a substrate such as a polymeric sheet. The polymeric materials on which the beads are coated may be coated with other materials in addition to the beads such as ink receptors, slip agents, antistats, etc.

TESTING METHODS

Preparation of Samples

To evaluate anti-friction properties of the polymer microspheres, a 10 weight percent aqueous solution of acrylic polymer Carboset 525 (B.F. Goodrich) was prepared by mixing 90 g of Carboset 525 flake, 800 g of deionized water, and 12 g of 30 percent ammonium hydroxide solution. 0.12 g of the beads of the invention was added to 40 g of the 10 percent Carboset 525 solution such that particle loading is 3 weight percent based on Carboset polymer. The mixture was thoroughly mixed in a sealed jar on a roller mill overnight to disperse the particles. The solution was then coated on air-corona treated 4 mil PET film using a #7 Meyer bar, and dried at 80° C. for two minutes.

Coefficient of Friction (ASTM D 4518-87)

The coefficient of friction (COF) of two stationary contacting bodies is defined as the ratio of tangential force $F_t$ applied to one of the bodies such that sliding against each other is induced, to the normal force N holding the bodies together. The ratio of the friction force at incipient sliding to the normal force is known as the static coefficient of friction.

A model SP-102B-3M90 model Slip/Peel Tester, from the Imass Company was used to measure the coefficient of friction (COF) of the coated sheets. The bead-coated sides of two sheets are brought in contact with each other, with one sheet attached to a 1-kg brass sled, tethered to a force gauge and the other sheet attached to a moveable platen. The platen is drawn at a constant speed of 15.24 cm/min, and the maximum and average coefficient of friction, obtained from the initial movement of the platen against the sled during a 25-second test period, are recorded directly from the Slip/Peel Tester readout.

ABBREVIATIONS

The following abbreviations are used herein.
BDDA = 1,4-butanediol diacrylate
HDDA = 1,6-hexanediol diacrylate
HDDMA = 1,6-hexanediol dimethacrylate
$C_{14}$DDA = $C_{14-15}$diol diacrylate
SMA = Stearyl methacrylate
DDDMA = 1,12-dodecanediol diacrylate
LA = Lauryl acrylate
ODA = Octadecyl acrylate
MMA = methyl methacrylate
TMPTMA = trimethylolpropane trimethacrylate
DVB = divinyl benzene
EMA = ethyl methacrylate
VAc = vinyl acetate
EGDMA = ethylene glycol dimethacrylate
COF = coefficient of friction
Max. = maximum
Avg. = average
mPa.s = miliPascal seconds
PET = Polyethylene terephthalate
VAZO TM 64 = 2,2'-azobis(isobutyronitrile)
Ex. = Example
No. = Number.

EXAMPLES

The following nonlimiting examples include exemplary preparations of the microspheres of the invention. All parts, percentages, ratios, etc. herein and in the rest of the specification are by weight unless otherwise specified.

PREPARATION OF DIETHANOLAMINE-ADIPIC ACID CONDENSATE PROMOTER

Equimolar amounts of adipic acid and diethanolamine were heated and stirred in a closed reaction flask. Dry nitrogen was constantly bubbled through the reaction mixture to remove water vapor, which was condensed and collected in a Barrett trap. When about 1.1 to 1.5 moles of water (based on 1 mole of adipic acid and 1 mole of diethanolamine) had been collected, the reaction was stopped by cooling the mixture. The resulting condensate was diluted with water and used in the examples below.

EXAMPLE 1

An aqueous mixture of 600 g deionized water, 10 g Ludox SM-30 colloidal silica (duPont), 2.4 g of 10% solution of diethanolamine-adipic acid condensate (as promoter) and 0.13 g of potassium dichromate was stirred and adjusted to pH 4 by addition of 10% sulfuric acid. A monomer solution of 32 g 1,4-buanediol diacrylate (BDDA, Sartomer) and 0.15 g of VAZO TM 64 initiator (duPont) was added to 56 g of the above aqueous mixture which was then stirred in a Waring TM blender for two minutes at low-speed setting. The mixture was poured into a glass bottle which was then purged with nitrogen, sealed and placed in a shaker water bath at 70° C. for 20 hours. The contents of the bottle were collected on a Buchner funnel and washed several times with water to give a wet cake. The wet cake was then dried at ambient temperature to give a free-flowing powder.

The COF (coefficient of friction) for microspheres from Example 1 to Example 14 are listed in Table 1.

EXAMPLE 2

Polymer microspheres were prepared and evaluated as in Example 1 except that BDDA monomer was replaced by 1,6-hexanediol diacrylate (HDDA, Sartomer).

EXAMPLE 3

Polymer microspheres were prepared and evaluated as in Example 1 except that BDDA monomer was replaced by 1,6-hexanediol dimethacrylate (HDDMA, Sartomer).

EXAMPLE 4

Polymer microspheres were prepared and evaluated as in Example 1 except that BDDA monomer was replaced by 1,12-dodecanediol dimethacrylate (DDDMA, Rohm Tech. Inc.).

EXAMPLE 5

Polymer microspheres were prepared and evaluated as in Example 1 except that BDDA monomer was replaced by $C_{14-15}$ diol diacrylate ($C_{14}$DDA, Sartomer).

EXAMPLE 6

Polymer microspheres were prepared and evaluated as in Example 1 except that BDDA monomer was replaced by 1:1 mixture of BDDA and stearyl methacrylate (SMA, Rohm & Haas).

EXAMPLE 7

Polymer microspheres were prepared and evaluated as in Example 1 except that BDDA monomer was replaced by 1:1 mixture of HDDA and SMA.

EXAMPLE 8

Polymer microspheres were prepared and evaluated as in Example 1 except that BDDA monomer was replaced by 1:4 mixture of HDDA and SMA.

EXAMPLE 9

Polymer microspheres were prepared and evaluated as in Example 1 except that BDDA monomer was replaced by 4:1 mixture of HDDA and SMA.

EXAMPLE 10

Polymer microspheres were prepared and evaluated as in Example 1 except that BDDA monomer was replaced by 1:1 mixture of BDDA and lauryl acrylate (LA, Sartomer).

EXAMPLE 11

Polymer microspheres were prepared and evaluated as in Example 1 except that BDDA monomer was replaced by 4:1 mixture of HDDA and MMA.

EXAMPLE 12

Polymer microspheres were prepared and evaluated as in Example 1 except that BDDA monomer was replaced by 2:7:1 mixture of HDDA, SMA, and trimethylol propane trimethacrylate (TMTPMA, Sartomer).

EXAMPLE 13

Polymer microspheres were prepared and evaluated as in Example 1 except that BDDA monomer was replaced by 3:5:2 mixture of HDDA, SMA, and ethyl methacrylate (EMA, Rohm & Haas).

EXAMPLE 14

Polymer microspheres were prepared and evaluated as in Example 1 except that BDDA monomer was replaced by 3:5:2 mixture of HDDA, SMA, and vinyl acetate (VAc).

COMPARATIVE EXAMPLE 1

A commercially available product of polystyrene particles, Finepearl 3000 SP-B (Matsumoto), was evaluated the same way as in Example 1. Coefficient of friction values for microspheres in Comparative Examples 1 to 7 are listed in Table 2.

COMPARATIVE EXAMPLE 2

Polymer microspheres were prepared and evaluated as in Example 1 except that BDDA monomer was replaced by 98:2 mixture of MMA and TMPTMA.

COMPARATIVE EXAMPLE 3

Polymer microspheres were prepared and evaluated as in Example 1 except that BDDA monomer was replaced by 1:1 mixture of MMA and SMA.

COMPARATIVE EXAMPLE 4

Polymer microspheres were prepared as in Example 1 except that BDDA monomer was replaced by 1:4 mixture of MMA and SMA. The microspheres were too soft and tended to stick together during drying, thus were not further evaluated.

COMPARATIVE EXAMPLE 5

Polymer microspheres were prepared as in Example 1 except that BDDA monomer was replaced by SMA. The microspheres were too soft and tended to stick together during drying, and thus were not further evaluated.

COMPARATIVE EXAMPLE 6

Polymer microspheres were prepared and evaluated as in Example 1 except that BDDA monomer was replaced by TMPTMA.

COMPARATIVE EXAMPLE 7

Polymer microspheres were prepared and evaluated as in Example 1 except that BDDA monomer was replaced by ethylene glycol dimethacrylate (EGDMA, Sartomer).

EXAMPLE 15

An aqueous mixture of 300 g deionized water, 10 g of Ludox SM-30 colloidal silica (duPont), 2.4 g of 10 percent solution of diethanolamine-adipic acid condensate (as promoter) and 0.065 g potassium dichromate was stirred and adjusted to pH 4 by addition of 10 percent sulfuric acid. A monomer mixture of 16 g lauryl acrylate (LA) and 16 g of $C_{14-15}$ diol diacrylate ($C_{14}DDA$), and 0.15 g of VAZO ™ 64 initiator (duPont) was added to 56 g of the above aqueous mixture which was then stirred in a Waring ™ blender for 2 minutes at low-speed setting. The mixture was poured into a glass bottle which was then purged with nitrogens, sealed and placed in a shaker water bath at 70° C. for 20 hours. The resulting microspheres were collected, washed, dried, and evaluated as in Example 1.

Coefficient of friction values for microspheres from Examples 15 to 17 are listed in Table 3.

EXAMPLE 16

Polymer microspheres were prepared and evaluated as in Example 15 except that the monomer mixture was replaced by 5:2:3 mixture of $C_{14-15}$ diol diacrylate ($C_{14}DDA$), lauryl acrylate (LA) and octadecyl acrylate (ODA, 3M).

EXAMPLE 17

Polymer microspheres were prepared and evaluated as in Example 15 except that the monomer mixture was replaced by 1:1 mixture of 1,12-dodecanediol dimethacrylate (DDDMA) and stearyl methacrylate (SMA).

EXAMPLE 18

Polymer microspheres were prepared as in Example 1 except that the BDDA monomer was replaced by 3:5:2 mixture of HDDA, SMA, and glycidyl methacrylate (GMA, Sartomer).

EXAMPLE 19

Polymer microspheres were prepared as in Example 1 except that the BDDA monomer was replaced by 9:10:1 mixture of HDDA, SMA, and gamma-glycidoxypropyl trimethoxylsilane (Z-6040, Dow Corning).

COMPARATIVE EXAMPLE 8

Polymer microspheres were prepared and evaluated as in Example 15 except that the monomer mixture was replaced by 98:2 mixture of MMA and TMPTMA.

Coefficient of friction values for microspheres in Comparative Examples 8 and 9 are listed in Table 4.

such as PMMA and polystyrene which are commonly used as anti-blocking additives.

TABLE 1

Coefficient of Friction Values for Microspheres from Example 1 and Example 14

| Ex. No. | Microsphere Composition | | | | Particle Size (μm) | COF | |
|---|---|---|---|---|---|---|---|
| | Difunctional Monomer | Long-Chain Monomer | Third Monomer | Ratio | | Max. | Avg. |
| 1 | BDDA | — | — | — | 5-15 | 0.61 | 0.43 |
| 2 | HDDA | — | — | — | 5-15 | 0.48 | 0.39 |
| 3 | HDDMA | — | — | — | 5-15 | 0.57 | 0.48 |
| 4 | DDDMA | — | — | — | 5-15 | 0.39 | 0.35 |
| 5 | $C_{14}DDA$ | — | — | — | 5-15 | 0.44 | 0.35 |
| 6 | BDDA | SMA | — | (1:1) | 5-15 | 0.50 | 0.43 |
| 7 | HDDA | SMA | — | (1:1) | 5-15 | 0.38 | 0.27 |
| 8 | HDDA | SMA | — | (1:4) | 5-15 | 0.52 | 0.44 |
| 9 | HDDA | SMA | — | (4:1) | 5-15 | 0.48 | 0.38 |
| 10 | BDDA | LA | — | (1:1) | 5-15 | 0.35 | 0.27 |
| 11 | HDDA | — | MMA | (4:1) | 5-15 | 0.46 | 0.39 |
| 12 | HDDA | SMA | TMPTMA | (2:7:1) | 5-15 | 0.42 | 0.39 |
| 13 | HDDA | SMA | EMA | (3:5:2) | 5-15 | 0.59 | 0.41 |
| 14 | HDDA | SMA | VAc | (3:5:2) | 5-15 | 0.51 | 0.38 |

COMPARATIVE EXAMPLE 9

Polymer microspheres were prepared and evaluated as in Example 15 except that the monomer mixture was replaced by 98:2 mixture of styrene and divinyl benzene (DVB).

EXAMPLE 20

Into a 2-liter resin flask were added 28.8 g of Dehyquart A (cetyl trimethylammonium chloride, 25% aqueous solution, available from Henkel Corp.) and 820 g of deionized water. In a separate flask, a mixture of 192 g 1,6-hexanediol diacrylate (Sartomer Chemicals), 192 g stearyl methacrylate (Rohm & Haas) and 1.2 g of VAZO TM 64 (2,2'-azobis (isobutyronitrile), from duPont) thermal free-radical initiator was stirred at room temperature until the VAZO TM 64 was dissolved. The contents of the flask were poured into the resin flask, with stirring at about 700 rpm, and stirred for about two minutes. The resulting coarse emulsion was twice passed through a Manton-Gaulin Homogenizer (Gaulin Corp.) at 500 psi, then returned to the resin flask and heated under nitrogen to about 60° C. with gentle agitation (about 400 to 500 rpm) for about 15 hours. The stable emulsion thus obtained contained about 30 percent by weight of submicron polymeric beads. Analysis with a Coulter N4 particle size analyzer (Coulter Electronics Inc.) showed an average particle size of 0.25 micron.

By comparing Table 1 with Table 2 and Table 3 with Table 4, one can see clearly that the microspheres prepared from compositions in this invention (Examples 1 to 17) all gave significantly lower coefficient of friction than the microspheres of similar particle size in the comparative examples, including polymer microspheres

TABLE 2

Coefficient of Friction Values for Microspheres from Comparative Example 1 to Comparative Example 7

| Comparative Example No. | Microsphere Composition | Particle Size (μm) | COF | |
|---|---|---|---|---|
| | | | Max. | Avg. |
| 1 | Styrene | 5-15 | 0.69 | 0.61 |
| 2 | MMA-TMPTMA (98:2) | 5-15 | 0.72 | 0.65 |
| 3 | MMA-SMA (1:1) | 5-15 | 0.81 | 0.70 |
| 4 | MMA-SMA (1:4) | 5-15 | to soft | |
| 5 | SMA | 5-15 | to soft | |
| 6 | TMPTMA | 5-15 | 0.63 | 0.58 |
| 7 | EGDMA | 5-15 | 0.77 | 0.68 |

TABLE 3

Coefficient of Friction Values for Microspheres from Examples 15 to 17

| Ex. No. | Microsphere Composition | | | | Particle Size (μm) | COF | |
|---|---|---|---|---|---|---|---|
| | Difunctional Monomer | Long-Chain Monomer | Third Monomer | Ratio | | Max. | Avg. |
| 15 | $C_{14}DDA$ | LA | — | (1:1) | 3-5 | 0.36 | 0.29 |
| 16 | $C_{14}DDA$ | LA-ODA | — | (5:2:3) | 3-5 | 0.40 | 0.36 |
| 17 | DDDMA | SMA | — | (1:1) | 3-5 | 0.41 | 0.32 |

TABLE 4

Coefficient of Friction Values for Microspheres from Comparative Examples 8 and 9

| Comparative Example No. | Microsphere Composition | Particle Size (μm) | COF | |
|---|---|---|---|---|
| | | | Max. | Avg. |
| 8 | MMA-TMPTMA (98-2) | 3-5 | 0.76 | 0.69 |
| 9 | Styrene (98-2) | 5 | 0.74 | 0.70 |

While this invention has been described in connection with specific embodiments, it should be understood that it is capable of further modification. The claims herein are intended to cover those variations which one skilled in the art would recognize as the chemical equivalent of what has been described here.

What is claimed is:

1. A bead having a mean bead diameter of from about 0.1 to about 50 microns, said bead comprising:
   (a) about 20 to about 100 percent by weight of polymerized diol di(meth)acrylate having a viscosity of about 1 mPa.s to about 400 mPa.s of the formula $$CH_2=CR^2COOC_nH_{2n}OOCCR^2=CH_2$$

wherein
R² is H or CH₃; and
n is an integer of about 4 to about 18;
(b) about 0 to about 80 percent by weight of at least one copolymerized vinyl monomer of the formula $$CH_2=CR^2COOC_mH_{2m+1}$$

wherein
R² is H or CH₃; and
m is an integer of about 12 to about 40;
(c) about 0 to about 30 percent by weight of at least one copolymerized ethylenically unsaturated monomer selected from the group consisting of vinyl esters, acrylic esters, methacrylic esters, styrene, styrene derivatives, and mixtures thereof; and
(d) about 0 to about 10 percent by weight of at least one organosilane coupling agent selected from the group consisting of glycidoxyalkyl trimethoxysilanes and (aminoalkylamino) alkyl trimethoxysilanes; wherein the weight percentages are based on the total weight of (a) plus (b) plus (c) plus (d).

2. The bead of claim 1 wherein said diol di(meth)acrylate is selected from the group consisting of 1,4-butanediol di(meth)acrylate, 1,6-hexanediol di(meth)acrylate, 1,8-octanediol di(meth)acrylate, 1,10-decanediol di(meth)acrylate, 1,12-dodecanediol di(meth)acrylate, 1,14-tetradecanediol di(meth)acrylate, and mixtures thereof.

3. The bead of claim 1 wherein said diol di(meth)acrylate is selected from the group consisting of 1,4-butanediol di(meth)acrylate, 1,6-hexanediol di(meth)acrylate, 1,12-dodecanediol di(meth)acrylate, 1,14-tetradecanediol di(meth)acrylate, and mixtures thereof.

4. The bead of claim 1 wherein said vinyl monomer is selected from the group consisting of lauryl (meth)acrylate, octadecyl (meth)acrylate, stearyl (meth)acrylate, and mixtures thereof.

5. The bead of claim 1 wherein said vinyl monomer is selected from the group consisting of stearyl methacrylate and lauryl acrylate.

6. The bead of claim 1 wherein said ethylencially unsaturated monomer is selected from the group consisting of vinyl acetate, vinyl propionate, and vinyl pivalate; methyl acrylate, cyclohexylacrylate, benzylacrylate, isobornyl acrylate, hydroxybutyl acrylate, and glycidyl acrylate; methyl methacrylate, butyl methacrylate, cyclohexyl methacrylate, benzyl methacrylate, ethyl methacrylate, gamma-methacryloxypropyl trimethoxylsilane, and glycidyl methacrylate; styrene; vinyl toluene; alpha-methyl styrene, and mixtures thereof.

7. A bead having a mean bead diameter of from about 0.1 to about 50 microns, said bead comprising:
(a) about 20 to about 99 percent by weight of polymerized diol di(meth)acrylate having a viscosity of about 1 mPa.s to about 400 mPa.s of the formula $$CH_2=CR^2COOC_nH_{2n}OOCCR^2=CH_2$$

wherein
R² is H or CH₃; and
n is an integer of about 4 to about 18;
(b) about 1 to about 79 percent by weight of at least one copolymerized vinyl monomer of the formula $$CH_2=CR^2COOC_mH_{2m+1}$$

wherein
R² is H or CH₃; and
m is an integer of about 12 to about 40;
(c) about 0 to about 30 percent by weight of at least one copolymerized ethylenically unsaturated monomer selected from the group consisting of vinyl esters, acrylic esters, methacrylic esters, styrene, styrene derivatives, and mixtures thereof; and
(d) about 0 to about 10 percent by weight of at least one organosilane coupling agent selected from the group consisting of glycidoxyalkyl trimethoxysilanes and (aminoalkylamino) alkyl trimethoxysilanes; wherein the weight percentages are based on the total weight of (a) plus (b) plus (c) plus (d).

8. A bead having a mean bead diameter of from about 0.1 to about 50 microns, said bead comprising:
(a) about 20 to about 98 percent by weight of polymerized diol di(meth)acrylate having a viscosity of about 1 mPa.s to about 400 mPa.s of the formula $$CH_2=CR^2COOC_nH_{2n}OOCCR^2=CH_2$$

wherein
R² is H or CH₃; and
n is an integer of about 4 to about 18;
(b) about 1 to about 79 percent by weight of at least one copolymerized vinyl monomer of the formula $$CH_2=CR^2COOC_mH_{2m+1}$$

wherein
R² is H or CH₃; and
m is an integer of about 12 to about 40;
(c) about 1 to about 29 percent by weight of at least one copolymerized ethylenically unsaturated monomer selected from the group consisting of vinyl esters, acrylic esters, methacrylic esters, styrene, styrene derivatives, and mixtures thereof; and
(d) about 0 to about 10 percent by weight of at least one organosilane coupling agent selected from the group consisting of glycidoxyalkyl trimethoxysilanes and (aminoalkylamino) alkyl trimethoxysilanes; wherein the weight percentages are based on the total weight of (a) plus (b) plus (c) plus (d).

9. The bead of claim 1 wherein n is an integer about 6 to about 14 and m is an integer of about 12 to about 18.

10. A coated substrate comprising a polymeric sheet coated with the beads of claim 1.

11. A coated substrate comprising a polymeric sheet coated with a mixture comprising the beads of claim 1 and a resin selected from the group consisting of acrylates, polyurethanes, polyesters, polyamides, vinyl esters, and mixtures thereof.

* * * * *

UNITED STATES PATENT AND TRADEMARK OFFICE
CERTIFICATE OF CORRECTION

PATENT NO. : 5,238,736
DATED : August 24, 1993
INVENTOR(S) : CHI-MING TSENG, CHUNG I. YOUNG, AND MANISHA SARKAR It is certified that error appears in the above-indentified patent and that said Letters Patent is hereby corrected as shown below:

Col. 3, line 1, "1 mPa.s" should read --1 mPa·s--.
Col. 3, line 1, "400 mPa.s," should read --400 mPa·s,--.
Col. 8, line 57, "beads of can" should read --beads can--.
Col. 9, line 59, "mPa.s" should read --mPa·s--.
Col. 14, Table 1 (3rd line), "Example 1 and Example" should read --Example 1 to Example--.
Col. 14, Table 2 (11th line), "to soft" should read --too soft--
Col. 14, Table 2 (12th line), "to soft" should read --too soft--
Col. 14, Table 4 (8th line), "Styrene (98-2)" should read --Styrene-DVB (98-2)--.

UNITED STATES PATENT AND TRADEMARK OFFICE
CERTIFICATE OF CORRECTION

PATENT NO. : 5,238,736
DATED : August 24, 1993
INVENTOR(S) : CHI-MING TSENG, CHUNG I. YOUNG, AND MANISHA SARKAR It is certified that error appears in the above-indentified patent and that said Letters Patent is hereby corrected as shown below:

Col. 14, line 68, "1 mPa.s" should read --1 mPa·s--.
Col. 14, line 68, "400 mPa.s" should read --400 mPa·s--.
Col. 15, line 59, "1 mPa.s" should read --1 mPa·s--.
Col. 15, line 59, "400 mPa.s" should read --400 mPa·s--.
Col. 16, line 27, "1 mPa.s" should read --1 mPa·s--.
Col. 16, line 27, "400 mPa.s" should read --400 mPa·s--.

3M's error

Signed and Sealed this

Thirty-first Day of January, 1995

Attest:

BRUCE LEHMAN

Attesting Officer

Commissioner of Patents and Trademarks